(12) United States Patent
Schroeder et al.

(10) Patent No.: US 8,333,057 B2
(45) Date of Patent: Dec. 18, 2012

(54) AUTOMATIC HEADER LATERAL TILT TO GROUND SPEED RESPONSE

(75) Inventors: Jay David Schroeder, Coal Valley, IL (US); Leo Gerald Bose, Wind Lake, WI (US)

(73) Assignee: CNH America LLC, New Holland, PA (US)

( * ) Notice: Subject to any disclaimer, the term of this patent is extended or adjusted under 35 U.S.C. 154(b) by 51 days.

(21) Appl. No.: 12/985,416

(22) Filed: Jan. 6, 2011

(65) Prior Publication Data

US 2012/0174549 A1 Jul. 12, 2012

(51) Int. Cl.
*A01D 41/14* (2006.01)

(52) U.S. Cl. .................................. 56/10.2 E

(58) Field of Classification Search ............. 56/10.2 R, 56/10.2 A–10.2 H, 208, 10.3, 10.8, 10.6, 56/11.1, 11.9, 12.1, 14.7, 14.9, 15.9, 210; 172/2–11; 701/50, 53; 460/1, 4, 6
See application file for complete search history.

(56) References Cited

U.S. PATENT DOCUMENTS

| | | | |
|---|---|---|---|
| 4,776,153 A | 10/1988 | DePauw et al. | |
| 4,944,141 A | 7/1990 | Orlando et al. | |
| 4,974,400 A | 12/1990 | Chubey et al. | |
| 5,463,854 A | 11/1995 | Chmielewski, Jr. et al. | |
| 5,469,694 A | 11/1995 | Panousheck et al. | |
| 6,523,333 B2 | 2/2003 | Metzger | |
| 6,588,187 B2 | 7/2003 | Engelstad et al. | |
| 6,591,591 B2 | 7/2003 | Coers et al. | |
| 6,615,570 B2 | 9/2003 | Beck et al. | |
| 6,681,551 B1 | 1/2004 | Sheidler et al. | |
| 6,813,873 B2 | 11/2004 | Allworden et al. | |
| 6,826,894 B2 | 12/2004 | Thiemann et al. | |
| 6,883,299 B1 | 4/2005 | Gramm | |
| 6,971,452 B2 | 12/2005 | Ocsenknecht et al. | |
| 7,311,013 B1 | 12/2007 | Hoskinson et al. | |
| 7,647,753 B2 * | 1/2010 | Schlipf | 56/10.2 E |
| 2006/0248868 A1 | 11/2006 | Otto et al. | |
| 2008/0155954 A1 | 7/2008 | Schlipf | |

* cited by examiner

*Primary Examiner* — Robert Pezzuto
(74) *Attorney, Agent, or Firm* — Michael G. Harms

(57) ABSTRACT

A method for adjusting the lateral tilt of a combine header. The method includes receiving, at a control system, a plurality of output voltages from a plurality of potentiometers; determining, by the control system, at least one adjustment signal; determining, by the control system, a rate for transmitting the at least one adjustment signal; transmitting, by the control system, the at least one adjustment signal at the determined rate to at least one adjustment mechanism operably connected to control system; and adjusting, by the at least one adjustment mechanism, the lateral tilt of the combine header in response to the at least one adjustment signal. The rate for transmitting the signal is determined based upon one or more of a forward speed of the combine, the weight of the combine head, and an input selection made by an operator of the combine.

12 Claims, 5 Drawing Sheets

AUTOMATIC HEADER LATERAL TILT TO GROUND SPEED RESPONSE

TECHNOLOGY FIELD

The present invention relates generally to agricultural harvesters, and more particularly, to an automatic header height control system for lateral tilt to ground speed sensitivity and responsiveness.

BACKGROUND

A combine harvester is a machine that is used to harvest grain crops. The objective is to complete several processes, which traditionally were distinct, in one pass of the machine over a particular part of the field. Among the crops that may be harvested with a combine are wheat, oats, rye, barley, corn, soybeans, and flax or linseed. The waste (e.g., straw) left behind on the field includes the remaining dried stems and leaves of the crop having limited nutrients which may be, for example, chopped and spread on the field or baled for feed, bedding for livestock, and biomass fuel capabilities.

The cut crop may be picked up and fed into the threshing and separating mechanism of the combine, typically consisting of a rotating threshing drum to which grooved steel bars may be bolted. These bars thresh or separate the grains and chaff from the straw through the action of the drum against the concaves, i.e., shaped "half drum," that may also be fitted with steel bars and a meshed grill, through which grain, chaff and smaller debris may fall, whereas the straw, being too big or long, is carried through to the outlet.

The operation of most combine harvesters requires substantial operational involvement and control by the operator. For example, in a combine the operator is required to control: the direction of the combine; the speed of the combine; the height of the combine head; the air flow through the combine cleaning fan; the amount of harvested crop stored on the combine; etc.

Most combines today utilize an automatic header height control system to maintain a constant cutting height above the ground regardless of the ground contour or ground position relative to the base combine. Most typical combines also have the ability to manually adjust the responsiveness and sensitivity of the system to adapt to customer preferences and forward travel speed. Generally, the higher the ground speed, the higher the responsiveness and the lower the sensitivity. In these conventional systems, however, to make changes to the automatic header height and lateral tilt system, the combine operator must either manually turn dials, or knobs, or pressure switches either on the control console or on a vehicle display. This manual action distracts from the operator's focus on maximizing the combine throughput.

Accordingly, it is useful to automate as many tasks as possible to reduce the effort required by the operator and to allow the operator to focus on other tasks. In particular, there is a need for an automatic header height control system for lateral tilt sensitivity and responsiveness.

SUMMARY

In a first exemplary embodiment, the present invention provides a method for adjusting the lateral tilt of a combine header. The method includes receiving, at a control system, a plurality of output voltages from a plurality of potentiometers; determining, by the control system, at least one adjustment signal; determining, by the control system, a rate for transmitting the at least one adjustment signal; transmitting, by the control system, the at least one adjustment signal at the determined rate to at least one adjustment mechanism operably connected to the control system; and adjusting, by the at least one adjustment mechanism, the lateral tilt of the combine header in response to the at least one adjustment signal.

In some embodiments, the rate is determined based upon a forward speed of the combine, the weight of the combine head, and an input selection made by an operator of the combine.

In some embodiments, the potentiometers are configured to produce the output voltages in response to a pressure signal received from a plurality of ground sensors placed along a width of the combine header.

In some embodiments, the adjustment mechanism is a hydraulic cylinder.

In a second exemplary embodiment, the present invention provides method of adjusting a combine header. The method includes receiving, at a control system, an output voltage from each of a plurality of potentiometers; determining, by the control system, a height adjustment signal and a lateral tilt adjustment signal based upon the output voltages; determining, by the control system, a rate for transmitting the height adjustment signal and the lateral tilt adjustment signal; transmitting, by the control system, the height adjustment signal and the rate adjustment signal at the determined rate; receiving, by a height adjustment mechanism operably connected to the control system, the height adjustment signal and adjusting a height of the combine header; and receiving, by a lateral tilt adjustment mechanism operably connected to the control system, the lateral tilt adjustment signal and adjusting a lateral tilt of the combine header.

In some embodiments, the potentiometers are configured to produce the output voltages in response to a pressure signal received from a plurality of hydraulic transducers placed along a width of the combine header.

In some embodiments, the height adjustment mechanism and the lateral tilt adjustment mechanism are hydraulic cylinders.

In a third exemplary embodiment, the present invention provides a system for adjusting a combine header. The system comprises a plurality of ground surface sensors, a plurality of potentiometers, wherein each of the plurality of potentiometers is operably connected to one of the plurality of ground surface sensors and configured to produce an output voltage, a control system operably connected to the plurality of potentiometers, a height adjustment mechanism operably connected to the control system, and a tilt adjustment mechanism operably connected to the control system. The control system is configured to receive the output voltages from each of the plurality of potentiometers, determine a height adjustment signal and a lateral tilt adjustment signal based upon the output voltages, determine a rate for transmitting the height adjustment signal and the lateral tilt adjustment signal, and transmit the height adjustment signal and the rate adjustment signal at the determined rate. The height adjustment mechanism is configured to receive the height adjustment signal and adjust a height of the combine header. The tilt adjustment mechanism is configured to receive the tilt adjustment signal and adjust a lateral tilt of the combine header.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

Embodiments of the present invention provide for the automatic adjustment of header lateral tilt to ground based upon the position of the header relative to the ground and the forward travel speed of the combine. Embodiments of the invention allow for automatic adjustment of the sensitivity and/or responsiveness of the header lateral tilt system based upon the forward travel speed of the combine. Lateral tilt refers to the side to side tilting of the header relative to the combine feeder. Adjustments to the header lateral tilt system performance relative to ground speed may be made in substantially real time without operator intervention.

From a high level, one benefit of this invention is to provide automatic operation (i.e., no operator intervention) of the header lateral tilt function in response to increases and/or decreases in travel speed of the combine in relation to the ground over which it is traveling. In some embodiment, sensitivity of the lateral tilt function of the combine header may translate directly to ground speed such that the faster the combine travels the less sensitive the system will be. Likewise, as the combine slows down, sensitivity increases. In some embodiments, responsiveness of the lateral tilt function of the combine header may translate directly to ground speed such that the faster the combine travels the more responsive the system is. This allows the header to follow to the ground more closely. And, as the combine slows down, responsiveness decreases. As the combine slows down, a quick response is not required and if the travel speed gets too slow and the response remains too fast, the header could shake side to side which is not desired. The automatic header lateral tilt to ground function may factor in the mass (i.e., the weight) of the header such that any components integrated into the combine to perform the lateral tilt movements or adjustments of the automatic header are configured and rated accordingly.

Figure 5:
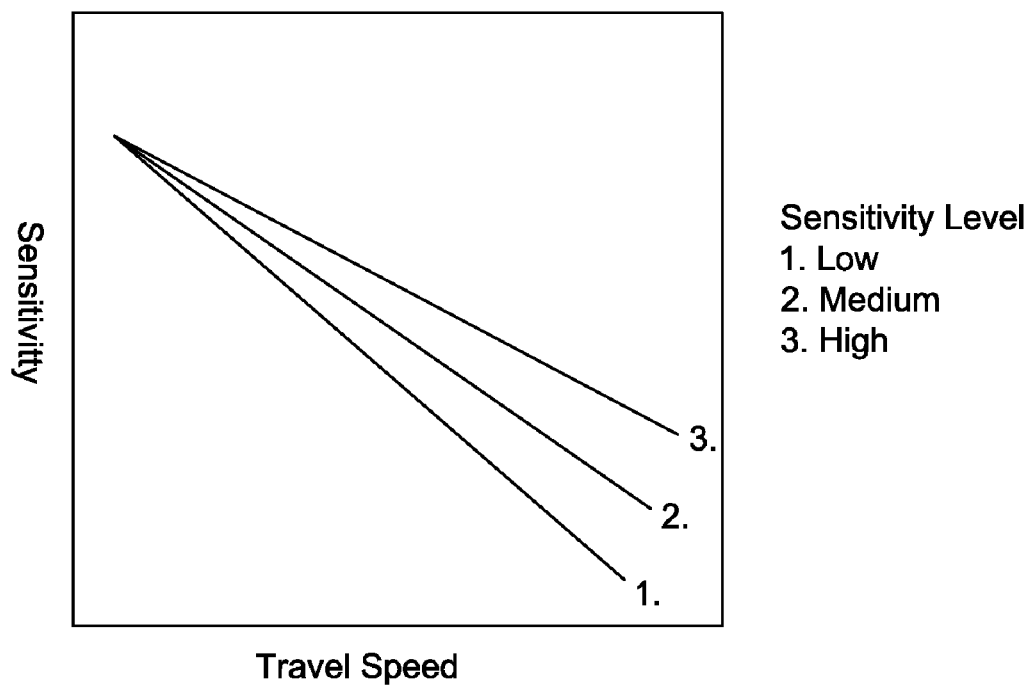
FIG. 5 illustrates an exemplary graph showing sensitivity versus travel speed.
Figure 6:
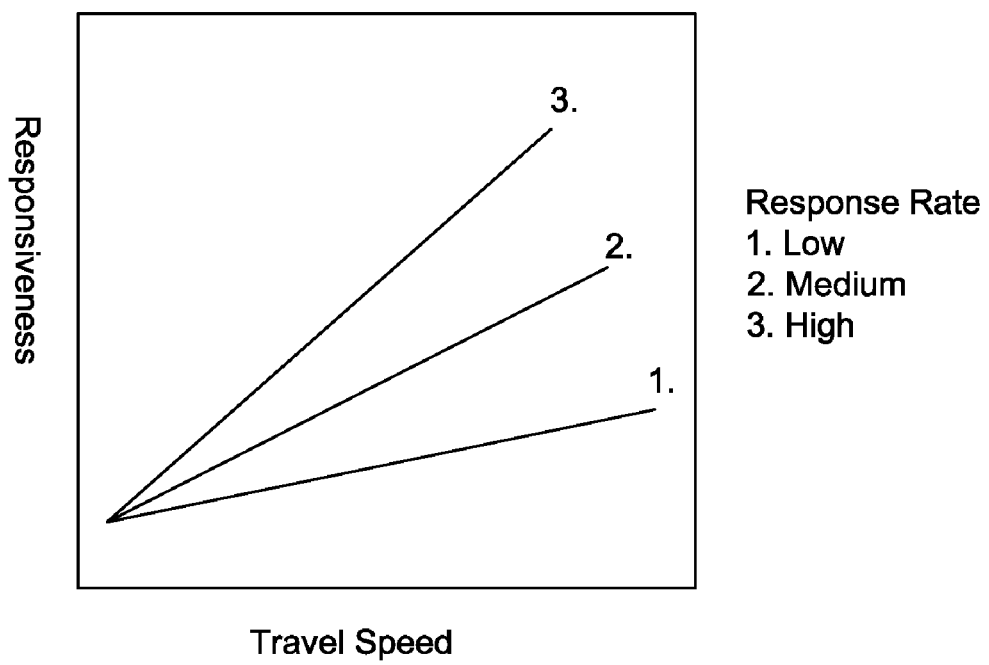
FIG. 6 illustrates an exemplary graph showing responsiveness versus travel speed.

Embodiments of the present invention may allow an operator to pre-select or pre-determine a particular sensitivity and/or response of the header for his or her preferred mode of operation. For example, two or more response curves and/or sensitivity curves may be provided to the operator for selection of a preferred mode of operation. For example, an operator may choose a response and/or sensitivity curve associated with a low, medium or high mode of operation as shown in FIGS. 5 and 6.

Figure 1:
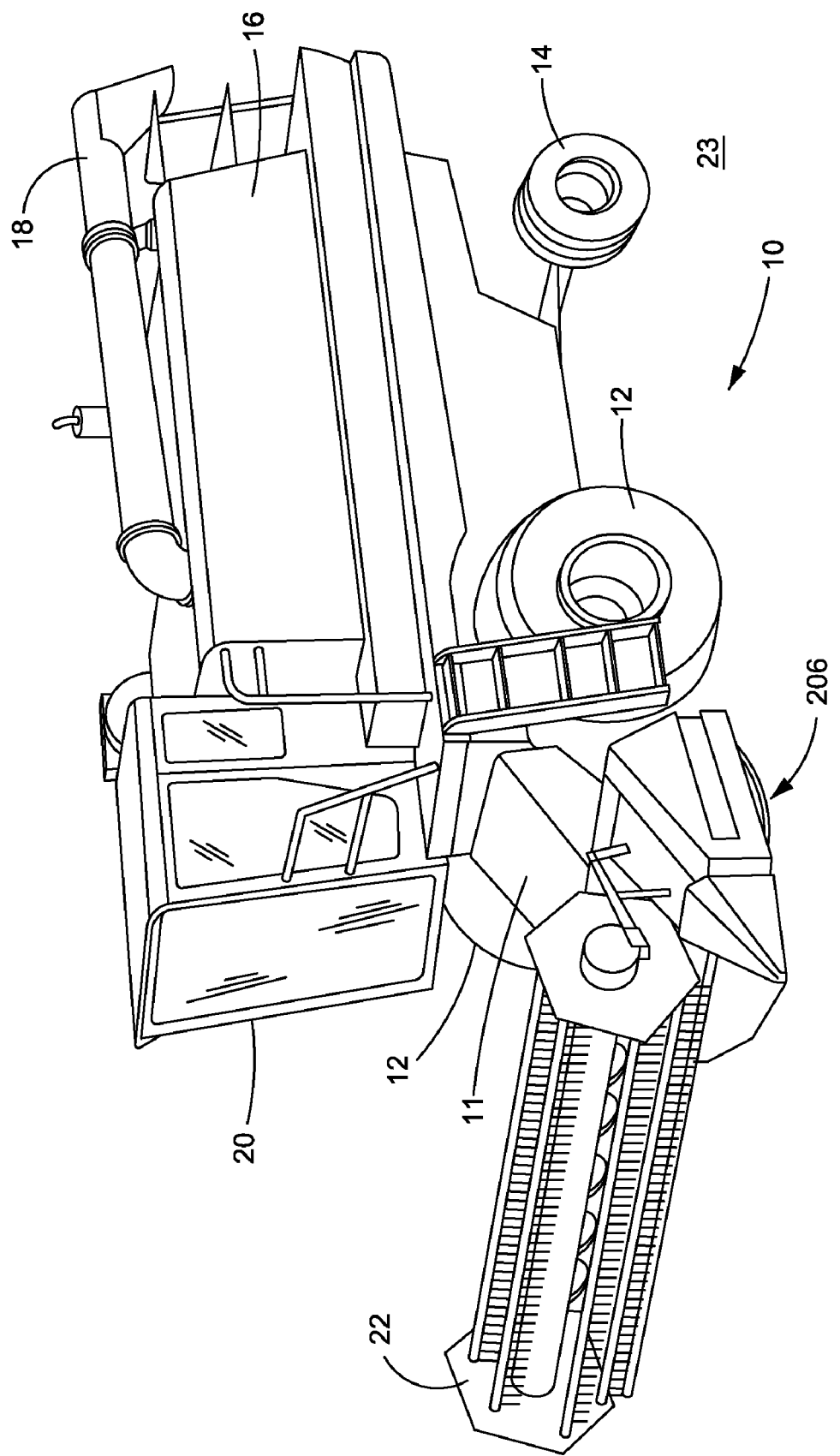
FIG. 1 is a perspective view of a combine harvester including a movable header for harvesting a crop material.

FIG. 1 shows an exemplary agricultural vehicle 10 having a pair of drive wheels 12 located at the front end of vehicle 10, a pair of steerable wheels 14 located at the rear end of vehicle 10, a combine feeder 11, a machinery and grain storage compartment 16, a grain elevator and chute 18, an operator cab 20, and a support frame (structure) for joining and supporting the above-listed components. By way of example only, agricultural vehicle 10 may be a combine, which may also be referred to as a harvester throughout this specification.

Attached to the front end of the frame of agricultural vehicle 10—i.e. the front-most end of vehicle 10 along its forward direction of travel during harvesting—is an implement 22 such as a grain harvesting head. Implement 22 may be positioned relative to vehicle 10 and/or the surface upon which vehicle 10 is moving—i.e. the ground from which the respective plant related matter, grain or vegetation, is being harvested. To efficiently harvest the grain or vegetation, it is useful to provide control over the position or location of implement 22.

Figure 2:
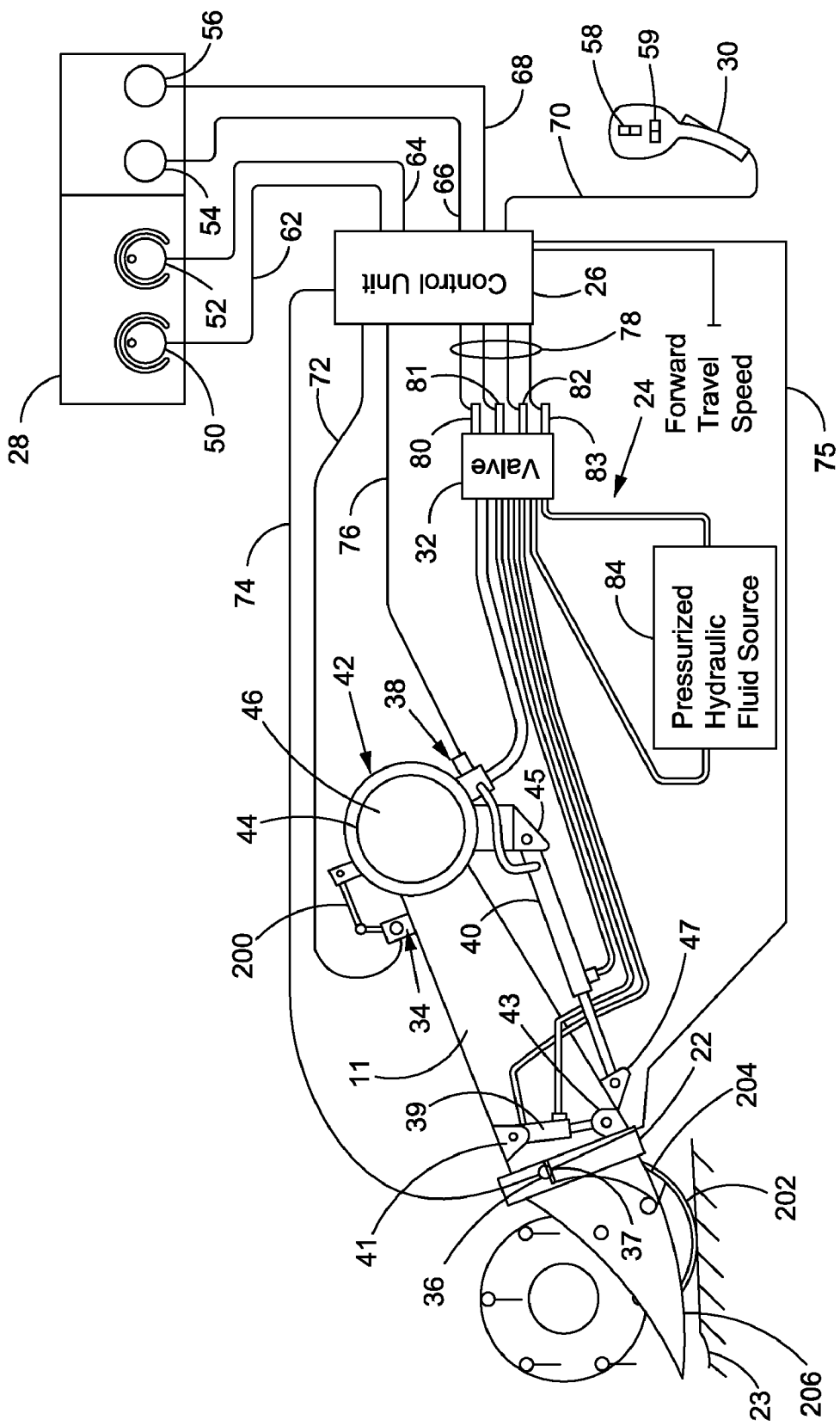
FIG. 2 is a schematic representation of an exemplary embodiment of an implement position control system configured to adjust both movable header height and lateral tilt to ground.

FIG. 2 is a schematic representation of the preferred embodiment of the implement 22 position control system 24. Control system 24 may include a microprocessor based control unit (circuit) 26, a manual-controller interface 28, a vehicle direction and speed control lever 30, a hydraulic control valve 32, a position transducer 34, a location transducer 36, pressure transducers 37 and 38, and implement positioners (lift and tilt mechanisms) 39 and 40 (e.g. hydraulic lift cylinders, hydraulic motor and gear arrangements, electric motor and gear arrangements, or some combination of these mechanisms). Control unit 26 may include one or more processors, computer readable memories, interconnections, input/output modules, multiplexers, and other common circuit components. Additional components may include specialized connectors for operably connecting the control unit 26 to a manufacturer specific component such as an auxiliary control unit or an auxiliary display. An example of a control unit is shown in FIGS. 3A-3C and the accompanying text of U.S. Pat. No. 5,469,694, entitled "Agricultural Vehicle Including A System For Automatically Moving An Implement To A Predetermined Operating Position," the contents of which is hereby incorporated by reference in its entirety.

In the present embodiment, mechanisms 39 and 40 include hydraulic lift cylinders and transducers 34 and 36 are potentiometers. However, transducers 34 and 36 could be replaced with linear variable differential transformers (LVDTs), and transducers 37 and 38 could be replaced by a current monitoring circuit if an electric motor were used in either mechanism 39 or 40. It should be noted that while only one location transducer 36 is shown in FIG. 2, multiple location transducers may be provided along the width of implement 22 to determine any potential differences (mechanically or hydraulically) among lateral ground tilt along the width of the implement.

Implement 22 is rotatably supported relative to vehicle 10 by a bearing assembly 42 such that the height of the implement may be altered relative to the surface 23. A similar lateral bearing structure may be provided to rotatably support the implement 22 relative to vehicle 10 via an interface positioned between the implement and combine feeder 11 such that the lateral tilt of the implement may be altered relative to the surface 23. Bearing assembly 42 includes a fixed bearing portion 44 and a movable bearing portion 46. Fixed bearing portion 44 is fastened to vehicle 10 and to attachment member 45, and lift mechanism 40 is mounted between member 45 and a second attachment member 47 fixed to combine feeder 11. The implement 22 is rigidly fixed to the combine feeder 11 such that, when the combine feeder is raised or lowered, the implement is raised or lowered accordingly. Similarly, tilt mechanism 39 is mounted between a third attachment member 41 and a fourth attachment member 43. Third attachment member 41 may be fastened to a component of vehicle 10 such as the side of the combine feeder 11, and fourth attachment member 43 is attached to a rotatable adapter, mounted between the combine feeder and implement 22. In this arrangement, system 24 may be operable to control mechanism 39 which moves (laterally tilts) implement 22 laterally relative to ground 23. System 24 may also be operable to control mechanism 40 which moves (lifts) implement 22 relative to vehicle 10. By way of modification, implement 22 may be movably supported relative to vehicle 10 using other mechanical arrangements such as, for example, a parallelogram linkage arrangement which supports implement 22 and, during raising and lowering, guides implement 22 along a path which is generally perpendicular to surface 23 (via lifting mechanism 40) with respect to the forward movement of vehicle 10, and follows any lateral changes in surface height (via tilting mechanism 39).

Referring more specifically to system 24, interface 28 may include various input devices such as a reference position (location) signal generator 50, a reference pressure signal generator 52, a raise rate signal generator 54, and a lowering rate signal generator 56. In the present embodiment, generators 50, 52, 54 and 56 may be potentiometers. However, generators 50, 52, 54 and 56 may be switches or a input mechanisms on a digital display screen which are capable of producing digital signals representative of the associated positions, pressures and rates. For example, the interface 28 may be configured to provide adjustment means for various signals such as raise rate, lower rate, tilt sensitivity, tilt response, raise sensitivity, raise response, and tilt rate. It should be noted these signals are provided for exemplary purposes only and may be adjusted accordingly depending on manufacturer or purchaser/operator specifications.

System 24 may also includes a raise and lower switch 58 which is mounted in operator control 30. By way of example, the raise and lower switch 58 is a centrally biased momentary contact switch. Similarly, a lateral tilt switch 59 may be mounted in operator control 30. The generator 50 may be coupled to the control unit by a signal bus 62, the generator 52 may be coupled to the control unit by a signal bus 64, the generator 54 may be coupled to the control unit by a signal bus 66, the generator 56 may be coupled to the control unit by a signal bus 68, and the switches 58 and 59 may be coupled to the control unit by a signal bus 70.

The control unit 26 may also be coupled to the transducer 34 by a signal bus 72, the transducers 36 by a signal bus 74, the transducer 37 by a signal bus 75, and the transducer 38 by a signal bus 76. The control unit 26 may be coupled to a hydraulic control valve 32 by a signal bus 78. More specifically, control valve 32 may include a raise solenoid 80, a lowering solenoid 81, a first lateral tilt solenoid 82, and a second lateral tilt solenoid 83 to which signal bus 78 is connected. The control unit 26 may apply pulse width modulated signals to solenoids 80, 81, 82 and 83 which allows valve 32 to control the flow of fluid between a pressurized hydraulic fluid source 84 and both tilt mechanism 39 and lift mechanism 40. In the present embodiment, source 84 is a hydraulic pump connected in series with a hydraulic fluid storage tank and appropriate filters.

As discussed above, transducers 34 and 36 are potentiometers in the present embodiment. The potentiometer 34 may be mechanically coupled to a linkage arrangement 200 which rotates the wiper of potentiometer 34 to produce a voltage representative of the positional relationship between implement 22 and vehicle 10. The potentiometers 36 may be mechanically coupled to multiple location sensor skids 202, located generally at the outer edges of implement 22 but may include additional locations such as the center of the implement, and to a linkage arrangement 204 which move the wiper of potentiometers 36 based upon the distance between the bottom 206 of implement 22 and the surface 23 upon which skid 202 is resting. Each potentiometer 36 may be associated and connected to with a single skid 202 such that each potentiometer 36 may independently produce a voltage signal specific to an individual skid. This arrangement of potentiometers 36, skids 202 and linkage arrangement 204 produces a voltage representative of the distance between various portions of bottom 206 and surface 23. Thus, by comparing the voltage based representations of the distance between various portions of the bottom 206 and surface 23, the lateral tilt of the implement 22 may be adjusted such that the implement maintains a constant height above surface 23.

Alternatively, depending upon the application, another type of proximity sensor such as an ultrasound sensor could be substituted for potentiometers 36, skids 202 and linkage arrangement 204 to produce a signal representative of the distance between bottom 206 and surface 23.

In the present embodiment, the transducer 37 may be a pressure sensor on the implement 22 which communicates with the fluid conduit which pressurizes tilting cylinder 39 to provide lateral tilt for the implement. Similarly, transducer 38 may be a pressure transducer which communicates with the fluid conduit which pressurizes lift cylinder 40 to raise implement 22. This arrangement of pressure transducers 37 and 38 may produce a signal representative of the force being applied to implement 22 for example, equal to some minimum value when the full weight of implement 22 is not being supported by surface 23.

The control system 24 may operate in various modes such as, for example, a manual mode, a return to cut (RTC) mode, a float mode, and a height mode. In the manual mode, the system 24 may move implement 22 up and down, and adjust lateral tilt of the implement, in response to the operation of switches 58 and 59. In the height mode, control system 24 may maintain implement 22 at a selected height relative to surface 23, adjusting the height and lateral tilt of the implement accordingly. In the float mode, system 24 may maintain implement 22 at a selected contact pressure with surface 23, adjusting the height and lateral tilt of the implement depending on changes in the contour of surface 23. In the RTC mode, the system 24 may allow the user to raise the implement 22 from a predetermined position by toggling the switch 58 upward to the raise position (typically at the end of a row in a field) and then automatically return to the cutting position by toggling the switch downward to the lower position (typically at the beginning of a row in the field).

Figure 3:
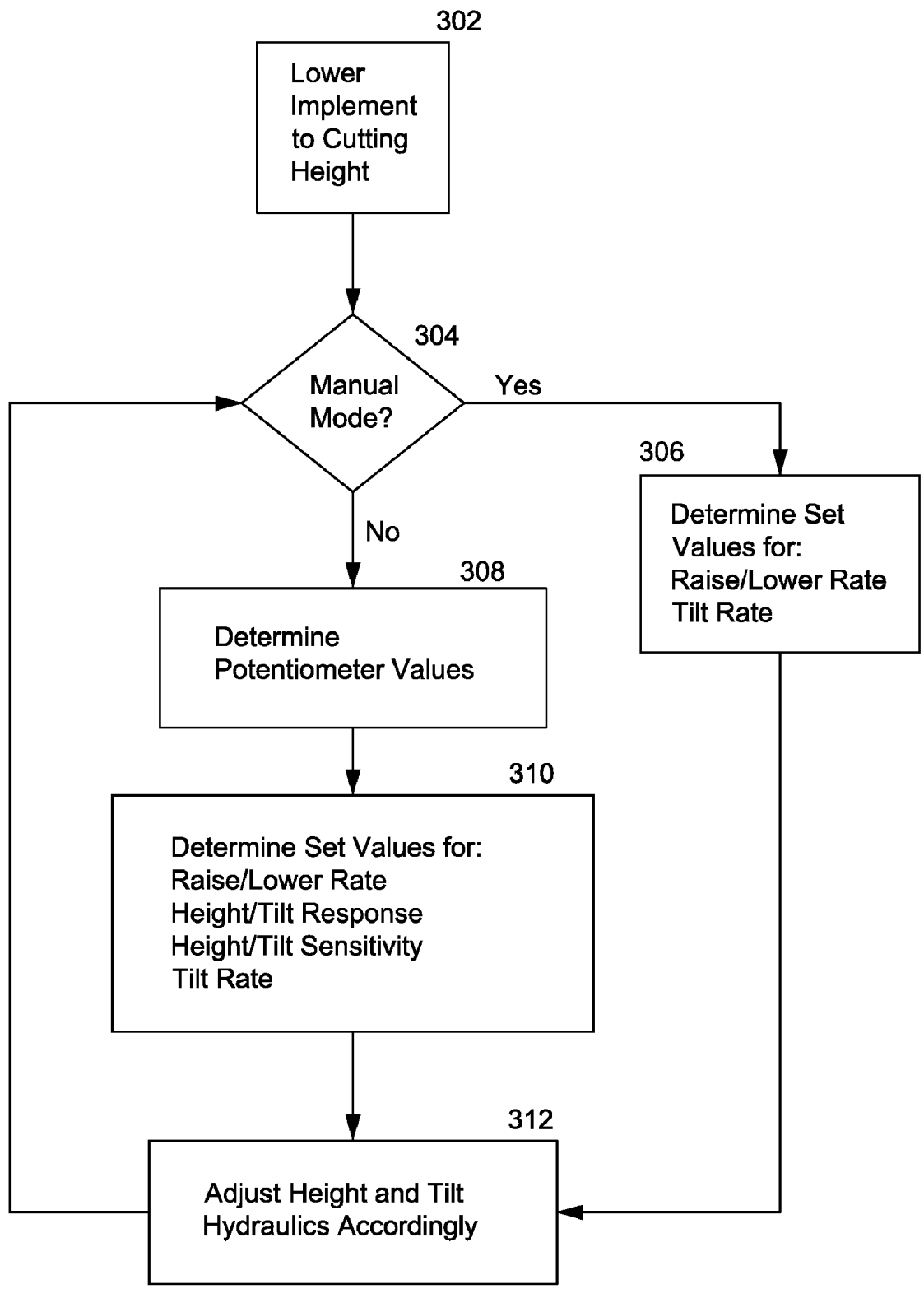
FIG. 3 illustrates an exemplary logic flow diagram of one embodiment for implementing an automatic header control for lateral tilt sensitivity and responsiveness.

FIG. 3 illustrates an exemplary flow diagram illustrating one exemplary embodiment of adjusting height and tilt of the implement 22 while operating the vehicle 10. Initially, the implement 22 may be lowered 302 into cutting position. Once the implement is in a cutting position, the control system 24 may determine 304 whether the operator is using manual mode. If the operator is in manual mode, the control system may determine 306 what values the user has set for various functions of the vehicle 10. For example, the control system may determine 306 any set values for raise/lower rate and tilt rate of the implement 10. The control system may then adjust 312 the height and tilt hydraulics accordingly based upon the operator set values.

If the operator is not using manual mode, the control system may determine 308 the current values of potentiometers 36. Based upon these values from the potentiometers 36, the control unit 26 may determine the difference in ground contour along the width of the implement 22. The control unit may then determine 310 any set performance values. For example, the set values may include, but are not limited to, raise/lower rate, height/tilt response, height/tilt sensitivity, and tilt rate. These set values may be determined 310 based upon a comparison of the forward speed of the vehicle 10 and the current values of the potentiometers 36. Based upon this comparison information, the control system 24 may adjust 312 the tilt and height hydraulics 39, 40 accordingly. An exemplary method of determining and adjusting height is illustrated and explained in FIGS. 4A-4C and the accompanying text of U.S. Pat. No. 5,469,694.

Figure 4:
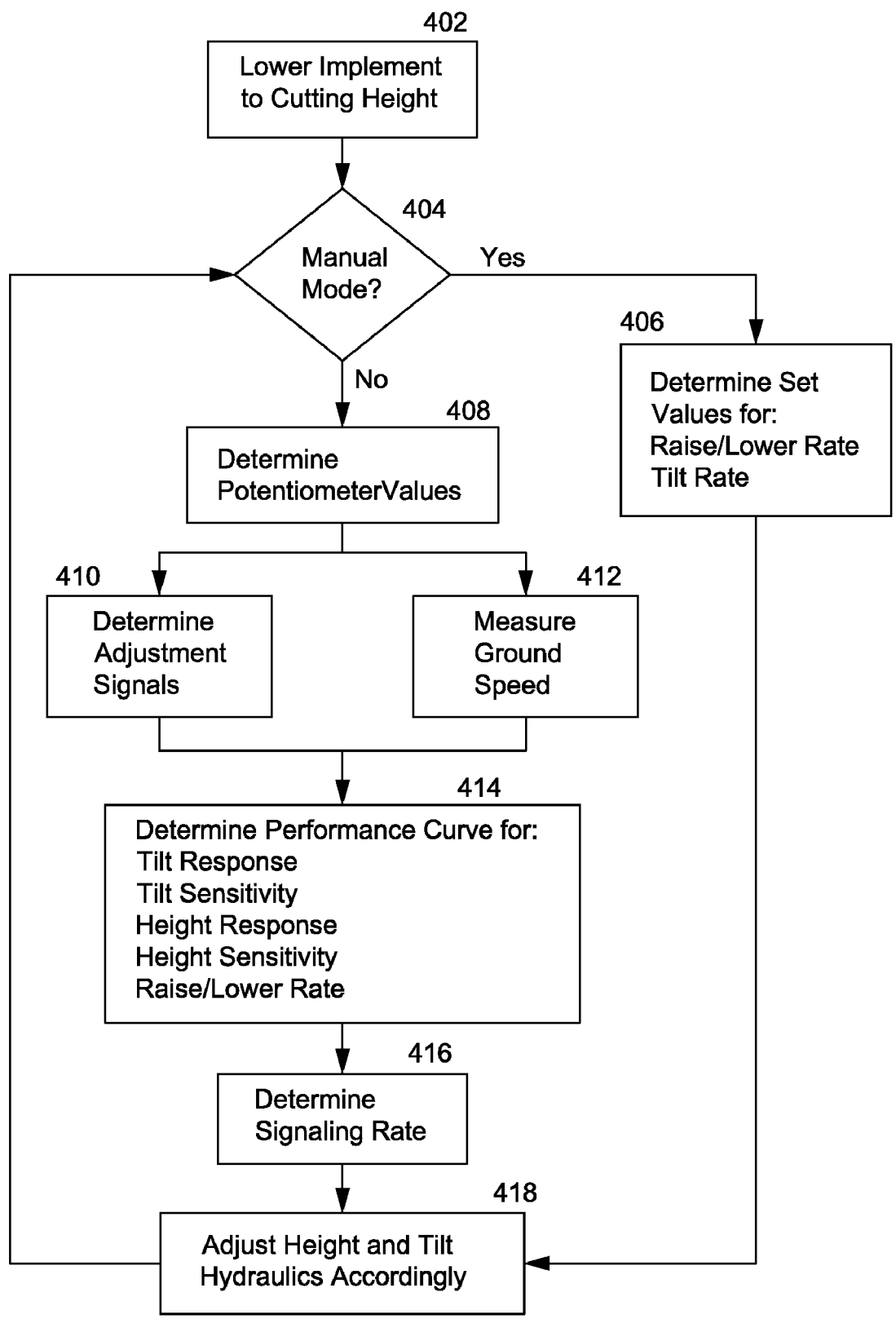
FIG. 4 illustrates an exemplary logic flow diagram of one embodiment for implementing an automatic header control for lateral tilt sensitivity and responsiveness.

FIG. 4 illustrates an exemplary flow diagram illustrating one exemplary embodiment of adjusting height and tilt of the implement 22 with respect to the speed of forward movement of vehicle 10. Initially, the implement 22 may be lowered 402 into cutting position. Once the implement is in a cutting position, the control system 24 may determine 404 whether the operator is using manual mode. If the operator is in manual mode, the control system may determine 406 what values the user has set for various functions of the vehicle 10. For example, the control system may determine 406 any set values for raise/lower rate and tilt rate of the implement 10. The control system may then adjust 418 the height and tilt hydraulics accordingly based upon the operator set values.

If the user is not using manual mode, the control system may determine 408 the current values of potentiometers 36 and/or the pressure transducers 37 and 38. Each potentiometer 36 may be connected directly to a skid sensor 202 placed at various positions along the width of the implement 22. Each skid sensor 202 may be spaced along the implement 22 such that the difference between the ground surface 23 and the bottom surface 206 at each of the various positions may be represented in the output voltage of each of the potentiometers 36. Based upon these values, the control unit 26 may determine the difference in ground contour along the width of the implement 22. The control system determine an appropriate height setting and lateral tilt setting based upon the measured voltages or output pressures. The control system 24 may determine 410 one or more adjustment signals based upon the determined height and lateral tilt settings. For example, if the ground surface 23 is much closer to the right side of the implement 22 than the left (as determine based upon the voltages of the potentiometers 36 associated with the left and right skid sensors 202), the control system 24 may determine the implement should be slightly tilted to the left, thereby balancing the difference in height between the right and left sides of the implement.

Similarly, the control system 24 may measure 412 the ground speed of the vehicle 10. The ground speed may be measured 412 by monitoring the rotation of the drive wheels 12 of the vehicle, by measuring the revolutions per minute (RPMS) or a driveshaft coming out of the engine and/or transmission of the vehicle, or via other accepted speed calculating methods such as GPS position calculation/speed translation. It should be noted that while determining 410 the adjustment signals and measuring 412 the speed of the vehicle 10 are shown as being performed simultaneously, the steps may be performed in an alternative order.

The control system may then determine 414 a user selected performance curve. The operator selected performance curve (examples are shown in FIGS. 5 and 6) may include signaling rates for various signals including, but not limited to, tilt response, tilt sensitivity, height response, height sensitivity, and raise/lower rate.

Based upon the speed of the vehicle 10 and the operator selected performance curve, the control system 24 may determine 416 a rate for signaling the height and lateral tilt adjustment cylinders. For example, if the vehicle is traveling at a higher speed and the user has selected a performance curve that provides a high level of responsiveness at high speed, the signaling rate may be increased such that the height and lateral tilt of the implement 22 is adjusted quicker, thereby maintaining a higher likelihood of having an optimally adjusted implement with respect to the ground surface 23. Conversely, when traveling at a slower speed, the control system may determine 416 a lower signaling rate. The control system may make the determination based upon an algorithm or other similar means. For example, a series of if/then statements may be looped into a software modules for use in determining the signaling rate. An exemplary algorithm may be:

If speed <4 MPH, signal every 500 milliseconds
If speed <8 MPH and >4 MPH, signal every 250 milliseconds
If speed >8 MPH, signal every 100 milliseconds The control system 24 may transmit the adjustment signals at the determined rate, and the control valve 32 may receive the adjustment signals and adjust 418 the tilt and height hydraulics 39, 40 accordingly. If the operator is using manual mode, the control system may adjust 418 the tilt and height hydraulics 39, 40 in response to any input received from the operator. This process may repeat until the operator lifts the implement from the lowered cutting position.

As discussed above in regard to FIG. 4, and in greater detail below, when the implement 22 is moved by the control system 24, the speed of movement is based upon the difference between the selected position and the desired position, the selected height and the actual height, the speed of the vehicle, and/or the difference between selected float pressure and the actual float pressure (e.g., a proportional control where a selected float pressure on the implement as compared to the actual pressure on the implement). Thus, when the difference in float pressures is large, the error is large, and the width of the pulses applied to the appropriate solenoid 80, 81, 82 or 83. As the implement is moved toward the desired position, height location or float position, the error is reduced, the width of the pulses applied is reduced to slow the speed at which implement 22 is moved, and the speed of the implement movement (both height and tilt) goes to zero when the desired setpoint for the implement is reached.

FIG. 5 is a graph showing an exemplary curve illustrating sensitivity (e.g., response time) versus travel speed. As shown in FIG. 5, as travel speed increases, it is preferred that system sensitivity decrease. The reason for this type of response is to avoid an unstable situation. For example, if the combine is traveling fast the sensor may be sending so many changes of the signal to the vehicle controller that the controller and controls can not react fast enough and hence an unstable situation may arise. To avoid this type of situation, the sensitivity may decrease as travel speed increases. Sensitivity may be decreased by, for example, averaging out the signal as it comes to the vehicle.

FIG. 6 is a graph showing responsiveness versus travel speed. As shown in FIG. 6, as travel speed increases, it is preferred that system responsiveness also increase. Accordingly, on the response side, it is desirable to have the header lateral tilt respond faster so that the lateral position of the header is optimized. Essentially, the control unit 26 may obtain a sampling of the signal from the potentiometers 36 at a certain time (e.g., every microsecond). Depending on the corresponding measured speed of the vehicle, the timing of adjustment pulses sent to the appropriate solenoid varies such that the movement of implement 22 is performed smoothly without and jerks or sudden movements.

FIGS. 5 and 6 each show three separate curves. Embodiments of the present invention may allow an operator to select the system performance from two or more different curves to tailor the system to his or her individual preferences. For example, the operator may select from a low, medium or high response rate mode. As shown, as travel speed increases, a slope of a line may direct the controller what percent to increase or decrease the rate at which the hydraulics, for example, are activated to move the lateral tilt of the header based upon the operator selected response rate.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A method for adjusting lateral tilt of a combine header comprising:
   coupling a plurality of ground sensors along a width of the combine header,
   wherein the ground sensors are disposed along a bottom portion of the combine header;
   configuring the ground sensors to generate a voltage based representation of the distance between each ground sensor and the ground surface;
   configuring a plurality of potentiometers to produce output voltages specific for each ground sensor in response to each voltage based representation received from each ground sensor;
   receiving, at a control system, the plurality of output voltages from the plurality of potentiometers;
   comparing, at the control system, the output voltages from the plurality of potentiometers to determine the distance between each ground sensor and the ground surface along the width of the combine header;
   determining, by the control system, at least one adjustment signal based on the comparison of output voltages;
   determining, by the control system, a rate for transmitting the at least one adjustment signal;
   transmitting, by the control system, the at least one adjustment signal at the determined rate to at least one adjustment mechanism operably connected to control system; and
   adjusting, by the at least one adjustment mechanism, the lateral tilt of the combine header in response to the at least one adjustment signal, such that the distance between all ground sensors and the ground surface are approximate equal thereby maintaining the combine header at a constant height about the ground surface.

2. The method of claim 1, wherein the rate is further determine based upon a forward speed of the combine.

3. The method of claim 2, wherein the rate is further determine based upon a weight of the combine header.

4. The method of claim 2, wherein the rate is further determined based upon an input selection made by an operator of the combine.

5. The method of claim 1, wherein the adjustment mechanism is a hydraulic cylinder.

6. A method of adjusting a combine header comprising:
   receiving, at a control system, an output voltage from each of a plurality of potentiometers;
   determining, by the control system, a height adjustment signal and a lateral tilt adjustment signal based upon the output voltages;
   configuring a first performance curve wherein as a forward speed of the combine increases, at least one of the height adjustment signal rate and the lateral tilt adjustment signal rate decreases so as to decrease sensitivity of the height and tilt adjustment of the combine header, wherein the first performance curve has at least a first and second mode, wherein the first mode has slower height and tilt adjustment signal rate than the second mode;
   configuring a second performance curve wherein as the forward speed of the combine increases, at least one of the height adjustment signal rate and the lateral tilt adjustment signal rate increases so as to increase responsiveness of the height and tilt adjustment of the combine header, wherein the second performance curve has at least a first and second mode, wherein the first mode has slower height and tilt adjustment signal rate than the second mode;
   selecting, by the operator, at least one of a first and second mode from at least one of the first and second performance curve;
   determining, by the control system, a rate for transmitting the height adjustment signal and the lateral tilt adjustment signal based on operator's selection of at least one of the first and second modes from at least one of the first and second performance curves;
   transmitting, by the control system, the height adjustment signal and the rate adjustment signal at the determined rate;
   receiving, by a height adjustment mechanism operably connected to the control system, the height adjustment signal and adjusting a height of the combine header; and
   receiving, by a lateral tilt adjustment mechanism operably connected to the control system, the lateral tilt adjustment signal and adjusting a lateral tilt of the combine header.

7. The method of claim 6, wherein the plurality of potentiometers are configured to produce the output voltages in response to a pressure signal received from a plurality of hydraulic transducers.

8. The method of claim 7, wherein the plurality of hydraulic transducers are placed along a width of the combine header.

9. The method of claim 6, wherein the height adjustment mechanism and the lateral tilt adjustment mechanism are hydraulic cylinders.

10. A system for adjusting a combine header comprising:
    a plurality of ground surface sensors;
    a plurality of potentiometers, wherein each of the plurality of potentiometers is operably connected to one of the plurality of ground surface sensors and configured to produce an output voltage;
    a control system operably connected to the plurality of potentiometers and configured to:
    receive the output voltages from each of the plurality of potentiometers, determine a height adjustment signal and a lateral tilt adjustment signal based upon the output voltages, determine a first performance curve wherein as a forward speed of the combine increases, at least one of the height adjustment signal rate and the lateral tilt adjustment signal rate decreases so as to decrease sensitivity of the height and tilt adjustment of the combine header, wherein the first performance curve has at least a first and second mode, wherein the first mode has slower height and tilt adjustment signal rate than the second mode;

determine a second performance curve wherein as the forward speed of the combine increases, at least one of the height adjustment signal rate and the lateral tilt adjustment signal rate increases so as to increase responsiveness of the height and tilt adjustment of the combine header, wherein the second performance curve has at least a first and second mode, wherein the first mode has slower height and tilt adjustment signal rate than the second mode;

receive an input from an operator wherein the operator has selected at least one of a first and second mode from at least one of the first and second performance curve;

determine a rate for transmitting the height adjustment signal and the lateral tilt adjustment signal, based on operator's selected input of at least one of the first and second modes from at least one of the first and second performance curves, and transmit the height adjustment signal and the rate adjustment signal at the determined rate;

a height adjustment mechanism operably connected to the control system and configured to:

receive the height adjustment signal, and adjust a height of the combine header; and a tilt adjustment mechanism operably connected to the control system and configured to:

receive the tilt adjustment signal, and adjust a lateral tilt of the combine header.

11. The system of claim 10, wherein the plurality of ground sensors are positioned along a width of the combine header.

12. The system of claim 10, wherein the height adjustment mechanism and the lateral tilt adjustment mechanism are double acting hydraulic cylinders.

* * * * *